Aug. 9, 1949.  R. DE O. McDILL  2,478,773
MAGNETIC MEASURING DEVICE AND METHOD
Filed June 21, 1943  3 Sheets-Sheet 2

Inventor
REX DE ORE McDILL.
by Charles Hills Attys.

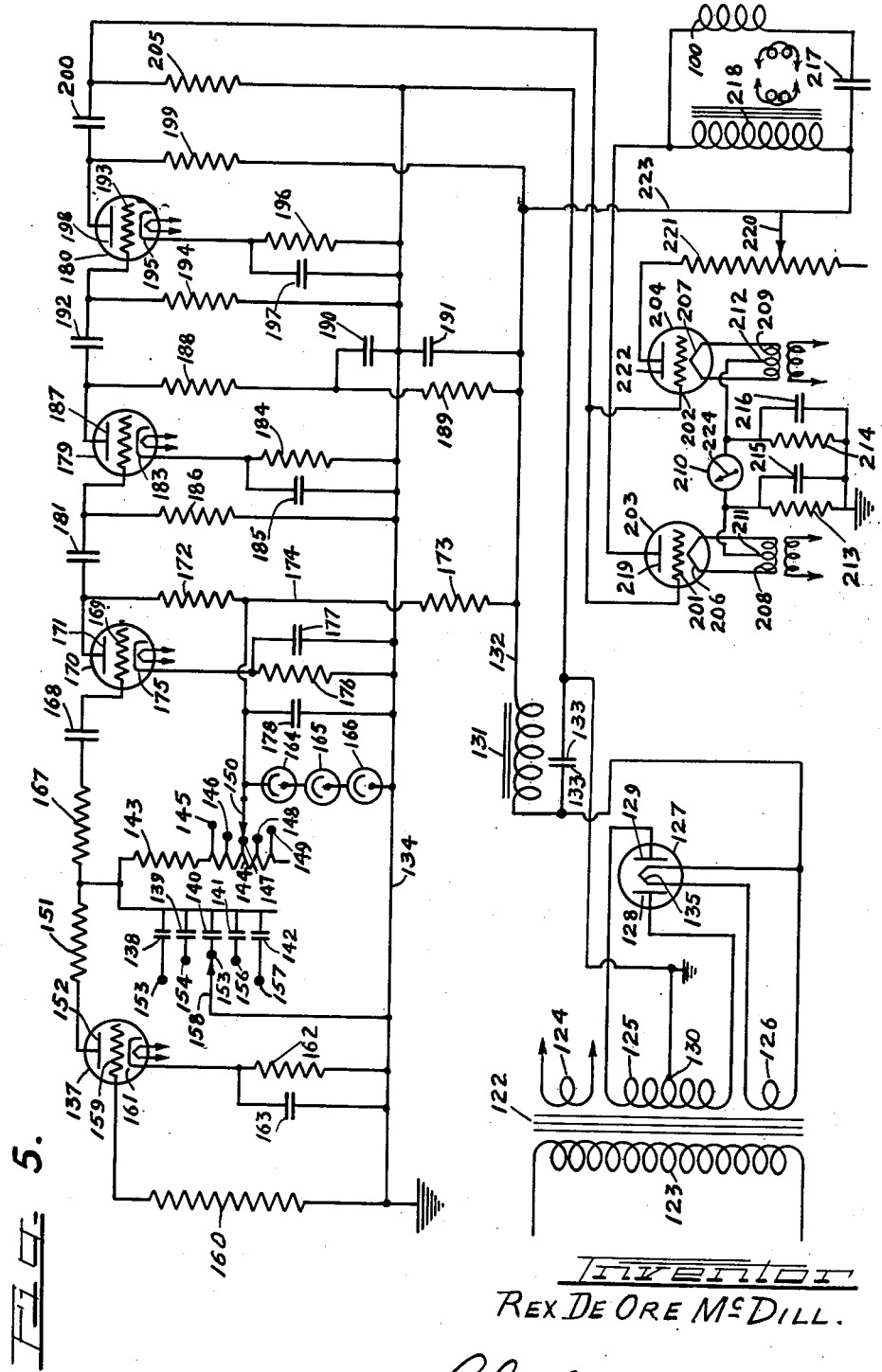

Patented Aug. 9, 1949

2,478,773

UNITED STATES PATENT OFFICE 2,478,773

MAGNETIC MEASURING DEVICE AND METHOD

Rex De Ore McDill, Cleveland, Ohio, assignor to Thompson Products, Inc., a corporation of Ohio Application June 21, 1943, Serial No. 491,664

10 Claims. (Cl. 175—183)

1

This invention relates to a measuring device, and more particularly to a method and means for measuring wall thickness, permeability and resistivity of ferro-magnetic structures.

In the past it has been difficult to make the above measurements with any great degree of accuracy where one side of the wall has been inaccessible and where the instrumentalities for carrying out the measurements were necessarily all located on one side thereof.

One of the principal features and objects of this invention is to provide a novel method and means for measuring wall thickness, permeability and resistivity by an eddy current penetration and magnetic flux method.

A more specific feature and object of the present invention is to provide a novel method and means for measuring the wall thickness in the head and skirt of an austenitic steel aircraft or other type valve which is partially filled with sodium.

Another object of the present invention is to provide a novel method and means for accurately measuring the sodium content of a sodium filled valve.

A further object of the present invention is to provide a measuring instrumentality which includes a coil carrying an audio-frequency current which is brough into proximity with a ferromagnetic structure, and the change in the inductance of the coil noted.

A still further object of the present invention is to provide a novel circuit arrangement for measuring apparatus.

The novel features which I believe to be characteristic of my invention are set forth with particularity in the appended claims. My invention itself, however, both as to its manner of construction and method of operation, together with further objects and advantages thereof, may best be understood by reference to the following description, taken in connection with the accompanying drawings, in which:

Figure 5 is a circuit diagram of a different embodiment of the present invention.

Figure 1:
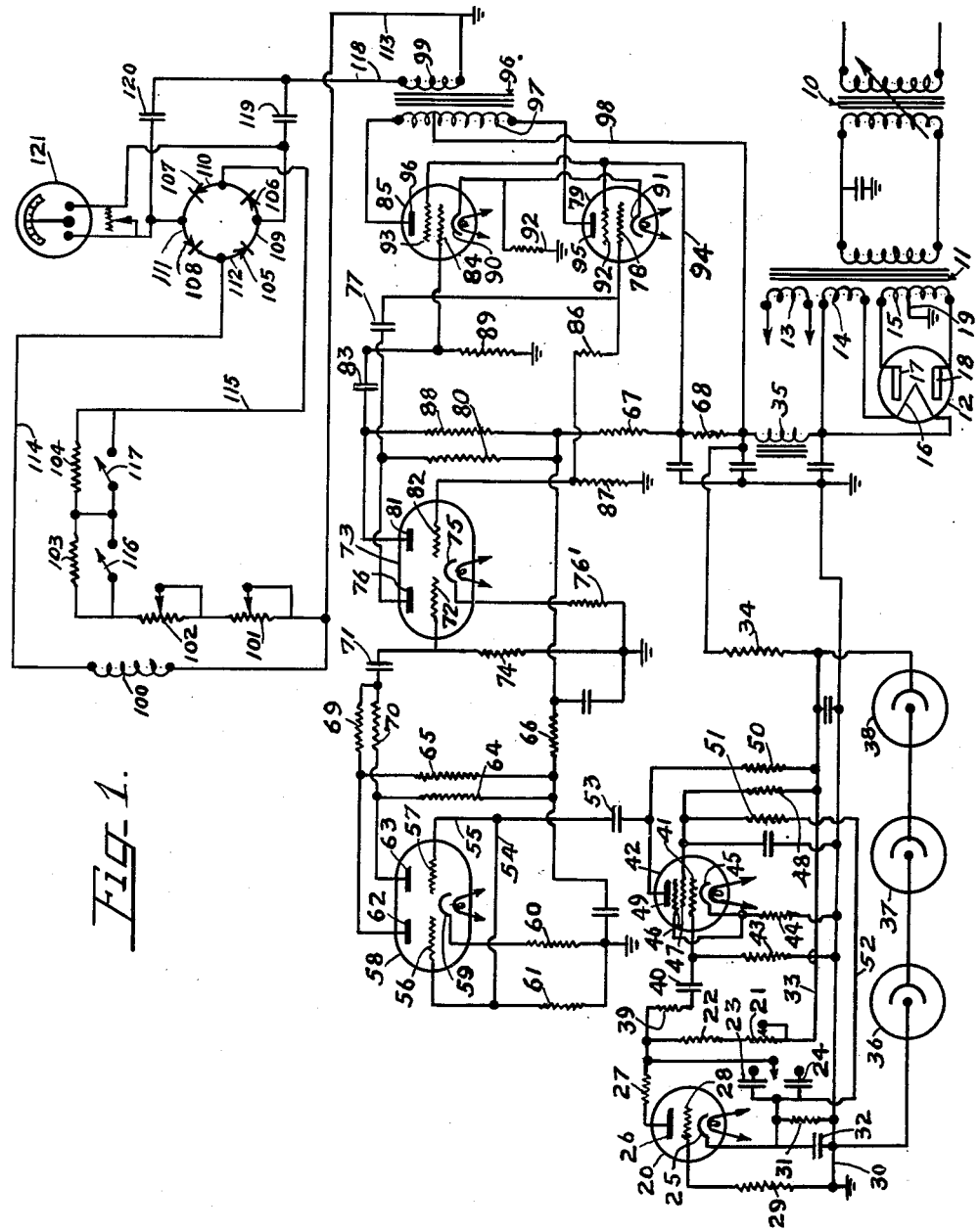
Figure 1 is a wiring diagram of one embodiment of the present invention.

In Figure 1 of the drawings a wiring diagram is shown which illustrates one embodiment of the present invention. As diagrammatically shown, the circuit includes a detector coil, a bridge, a sweep oscillator having closely regulated voltage and frequency, and an audio-amplifier, the oscillator and amplifier having a flat voltage output over a wide range of frequencies.

Referring now to Figure 1, power is supplied to the circuit through a voltage regulating transformer 10, a power transformer 11 and a full wave rectifier tube 12. Three secondary windings, 13, 14 and 15 are provided on transformer 11. Secondary winding 13 is the filament heating current winding for the various electron discharge devices provided in the circuit, and although the complete circuit is not shown, it will be understood from the diagrammatic representation that the filament of each of the electron discharge devices presently to be described, with the exception of tube 12, is connected to winding 13 and obtains a low voltage alternating current therefrom.

Secondary winding 14 is connected to the filament or directly heated cathode 16 of rectifier tube 12. Secondary winding 15 has its opposite ends connected to anode plates 17 and 18 of rectifier tube 12 and has its midpoint grounded as at 19.

A sweep oscillator is provided by gas triode 20, charging resistors 21 and 22 and condensers 23 and 24, which condensers are arranged to be selectively connected between the cathode 25 of gas triode 20, and plate 26 thereof through plate resistor 27. The charging resistors 21 and 22 together with one or the other of condensers 23 and 24 and the gas triode 20 form what is commonly referred to as a "sweep oscillator." A "sweep oscillator" is a relaxation oscillator in which a grid controlled gaseous rectifier is employed to periodically discharge a condenser on which a charge has gradually been built up through a charging resistor and in which the flashing voltage of the gaseous rectifier can be varied over wide limits by control of the negative grid bias.

As shown in Figure 1, the grid 28 receives its bias through a biasing resistor 29 which is connected to a grounded conductor 30.

The cathode 25 is self-biased through resistor 31 and condenser 32.

The anode 26 of triode 20 is connected through resistors 27, 22 and 21, conductor 33, resistor 34 and choke 35 to the cathode 16 of rectifier 12.

Three voltage regulators 36, 37 and 38 of the glow discharge type are preferably connected in series between the grounded conductor 30 and the conductor 33. As will presently be more fully pointed out, it is extremely important that very close voltage and frequency regulation be maintained. For this reason it is desirable to have close voltage regulation of the output of the oscillator circuit.

The output circuit of the gas triode 20 is connected through a resistor 39 and a coupling condenser 40 to the control grid 41 of a triple grid amplifier tube 42. A grid biasing resistor 43 is connected between the control grid 41 and the grounded conductor 30. A cathode biasing resistor 44 is connected between the cathode 45 and the grounded conductor 30. The suppressor grid 46 is connected to the cathode 45 in the usual manner. The screen grid 47 is connected through a resistor 48 to conductor 33. The plate or anode 49 is connected through a resistor 50 to the conductor 33. The screen grid 47 is also connected through a resistor 51 and conductor 52 to cathode 25 of the gas triode 20.

The output circuit of the amplifier 42 is connected through a coupling condenser 53 and conductors 54 and 55 to the twin grids 56 and 57 respectively of a twin triode amplifier electron discharge device 58. The cathode 59 is connected through a biasing resistor 60 to ground and the grids 56 and 57 are connected through a biasing resistor 61 to ground. The twin anodes 62 and 63 are connected through resistors 64 and 65 respectively and then in common through resistors 66, 67 and 68 and choke 35 to the cathode 16 of the rectifier 12.

The twin triode amplifier 58 is connected through coupling resistors 69 and 70 and a coupling condenser 71 to one control grid 72 of a twin triode amplifier 73. This control grid 72 receives its bias through a biasing resistor 74 which connects grid 72 to ground. The cathode 75 of the amplifier 73 receives its bias through a biasing resistor 76'. The anode 76 which is associated with the control grid 72 is connected through a coupling condenser 77 to the control grid 78 of a beam power amplifier 79. Anode 76 of amplifier 73 obtains its bias through resistor 80 and resistors 67, 68 and choke 35 from rectifier 12.

The second anode 81 and second grid 82 of the amplifier tube 73 are connected in a conventional push-pull arrangement. More specifically, the anode 81 is connected through a coupling condenser 83 to the control grid 84 of a beam power amplifier 85. The control grid 82 is connected through a resistor 86 to the control grid 78 of the beam power amplifier 79. It will be noted that the control grid 82 receives its bias through a biasing resistor 87 while the anode 81 receives its bias through a resistor 88, resistors 67 and 68 and choke 35 from rectifier 12. Grid 84 of amplifier 85 is connected through a biasing resistor 89 to ground. It will also be noted that control grid 78 of amplifier 79 is connected through resistors 86 and 87 to ground.

The cathode 90 of amplifier 85 and the cathode 91 of amplifier 79 are connected through a biasing resistor 92 to ground. The amplifier tubes 79 and 85 each have a screen grid 92 and 93 respectively which are connected through a conductor 94 and resistor 68 and choke 35 to the cathode circuit of rectifier 12.

From the above description it will be apparent that the twin triode amplifier 73 acts as a driver for the beam power amplifiers 79 and 85. The anodes 95 and 96 of the amplifiers 79 and 85 respectively are connected to opposite ends of the primary 97 of a transformer 98. The midpoint of the primary 97 is connected through a conductor 98 and choke 35 to the cathode circuit of the rectifier 12, by which the anodes 95 and 96 receive their necessary positive bias.

The transformer 98 is provided with a secondary 99 which is connected to an inductance bridge in a manner now to be described. The inductance bridge includes a detector coil 100, a group of resistance elements 101, 102, 103 and 104, and four dry rectifiers 105, 106, 107 and 108. The rectifiers 105 to 108 are connected in the form of a complete loop by conductors 109, 110, 111 and 112. The rectifiers, as diagrammatically shown in Figure 1, are connected so as to permit current to flow in only one direction around the loop. One end of the secondary winding 99 of transformer 98 is connected through a conductor 113 to the lower end of detector coil 100 and also to the lower end of resistance element 101. This conductor 113 is also grounded. The opposite end of the detector coil 100 is connected through a conductor 114 to conductor 112 of the rectifier loop. The opposite end of the series connected resistance elements 101, 102, 103, and 104 is connected through a conductor 115 to conductor 110 of the rectifier loop. It will be noted that this is directly across the rectifier loop from the point where the detector coil 100 is connected. Resistance elements 101 and 102 are preferably made variable to permit convenient adjustment, and resistance elements 103 and 104 are arranged to be shorted out through short circuiting switches 116 and 117 if desired.

The other end of the secondary winding 99 of transformer 98 is connected through a conductor 118 and condensers 119 and 120 to conductors 109 and 111 respectively of the rectifier loop.

A milli-ammeter 121 is connected across the rectifier bridge between conductors 109 and 111.

Figure 2:
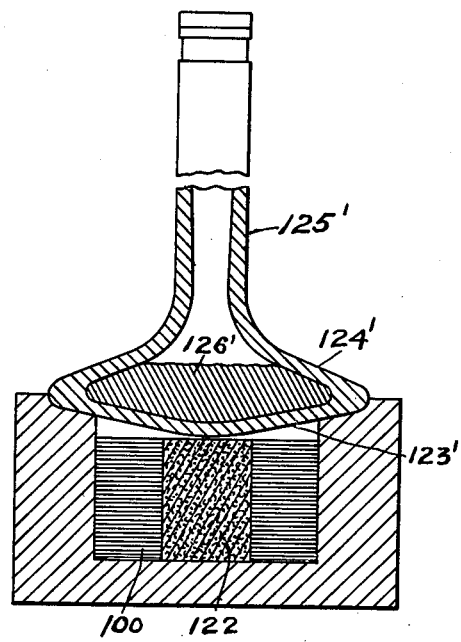
Figure 2 is a partial sectional view of an aircraft valve in association with the detector coil of the measuring device and of a supporting structure for holding the valve directly above the detector coil.
Figure 3:
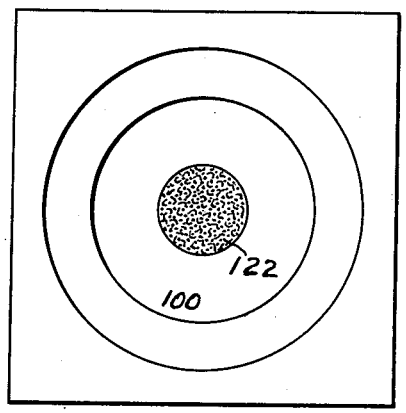
Figure 3 is a plan view of the detector coil and the supporting structure of Figure 2 if the valve were moved.
Figure 4:
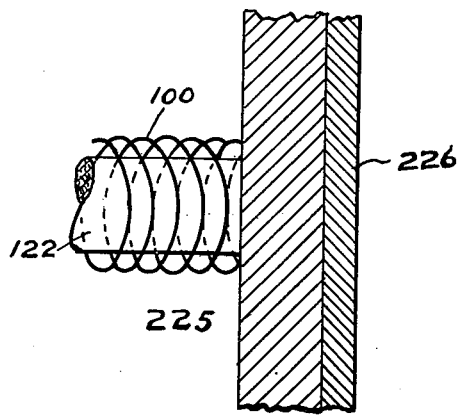
Figure 4 is a diagrammatic representation of the detector coil in close association with a ferromagnetic plate, which plate is backed up by another metal.

As is further illustrated in Figures 2, 3 and 4 of the drawings, the detector coil 100 is in the form of a solenoid wound on a powdered iron core 122.

I have discovered that the wall thickness of a metal valve or other ferro-magnetic structure may be accurately measured by bringing the detector coil adjacent one side of the wall, and then determining the difference in the flow of current through the detector coils brought about by the change in the inductive value of the coil. It is believed that this change in inductive value is due to the introduction of a material in the magnetic field of the coil and also to the extent of eddy current penetration in the material. It is further believed that the change in inductance in a detector coil is a function of the frequency of alternation of the current flowing therein, the permeability of the material against which the coil is positioned, the resistivity of the material and the thickness of the material (it being assumed that the material extends out beyond the side of the coil in all directions).

When tests are to be made on a number of items, all of which are made of the same material, it may be assumed that the permeability and the resistivity are constant. If the measuring apparatus is then set for operation at a given frequency it will readily be determined that the only variable remaining is the thickness dimension of the material. It will thus be apparent that the meter 121, as shown in Figure 1 of the drawings, may be calibrated directly in inches when the oscillator 20 is set for some predetermined frequency.

It has been found in practice that when the thickness of the wall of the head 123' and the skirt 124' of an aircraft valve 125' is to be measured that the order of magnitude of the frequency selected should be in the neighborhood of 5000 cycles per second. The valves 125', as shown in Figure 2, is partly filled with sodium, as indicated at 126'. Since the presence of sodium behind the wall whose thickness is to be measured will cause a difference in the reading on the meter 121 of the test instrument shown in Figure 1, it is important that the sodium be moved in the valve to a position directly behind the wall whose thickness is being measured. This may be conveniently done in any suitable manner, such for example, as vibrating the valve while under a raised temperature, as in the manner described in my copending application entitled "Valve vibrator and heater," U. S. Serial No. 491,665, filed June 21, 1943, now patent No. 2,400,158, issued May 14, 1946, and assigned to the same assignee as the present invention.

The meter 121 of the measuring apparatus shown in Figure 1 is calibrated empirically by noting the readings on the meter for various known wall thicknesses of valves of similar material.

If the skirt 124' of the valve 125' is to be measured, the sodium must be bumped into the skirt part of the valve so that the skirt is entirely backed up by sodium. Since most valves which contain sodium have approximately 75% of the internal space filled with sodium, the sodium may be conveniently bumped behind the skirt by turning the valve upside down from its position as shown in Figure 2.

I have further found in practice that the sodium content of the valve may be determined by selecting a much lower frequency and empirically calibrating a suitable scale on the meter. When wall thickness of a valve is to be determined, it is believed that a frequency should be selected in which the eddy current penetration does not extend entirely through the wall. That is to say, the eddy current penetration should be less than the wall thickness. According to Steinmetz, eddy current penetration is given by the following formula:

$$D = 2250\sqrt{\frac{P}{uf}}$$

Where:

D = depth of penetration in inches
P = resistivity in ohm-inches
u = permeability
f = frequency in cycles per second When testing for the sodium content of a valve, however, a frequency having the order of magnitude in the neighborhood of 180 cycles per second should be selected. The depth of eddy current penetration at this frequency extends well into the sodium content of the valve. It has been found that when the meter scale is calibrated empirically on the meter 121 from valves having various amounts of sodium therein, that a true and accurate indication will be given on the meter 121 of the sodium content of the valve when the oscillator is set for a relatively low frequency output. This, of course, may be done by properly selecting the condenser value and charging resistor value of these respective elements which are associated with the gas triode 20.

It will further be apparent to those skilled in the art that when the thickness dimension of the piece of material is known and where the permeability of the material is known, the same measuring device as that indicated in Figure 1 may be employed to measure resistivity. Under such circumstances, an appropriate scale is calibrated empirically from known samples for the meter 121 and for the frequency which is used. Similarly, it will be apparent that when the thickness of a piece of material is known and where the resistivity of the material is known, the measuring device of Figure 1 may be employed to measure permeability. In such a case an appropriate meter scale is calibrated for the meter 121 for some particular frequency and thickness of material.

It will still further be apparent to those skilled in the art that the measuring device of the present invention is particularly adaptable and suitable for measuring the thickness of a plate or wall member 225 which is backed up by a second and different type of material 226 as diagrammatically illustrated in Figure 4 which prevents the opposite side of the material being measured from being accessible for conventional types of measuring devices.

A modified form of circuit arrangement for a measuring device which will keep direct current out of the exploring coil or detector coil is diagrammatically represented in Figure 5 of the drawings. For simplicity of illustration, only three element electron discharge devices have been shown in this drawing, although it will of course be understood that in practice multi-electrode types of tubes will generally be found preferable.

The circuit as shown in Figure 5 includes a power transformer 122 having a primary coil 123 arranged to be connected to a suitable source of alternating current such as the conventional 110 volt 60 cycle alternating current generally provided by public utility companies throughout the country. The power transformer 122 is provided with three secondary windings 124, 125 and 126. The secondary winding 124 provides a low voltage alternating current for heating the filaments of the various electron discharge devices of the oscillator and amplifier circuit presently to be described. The winding 126 is the cathode winding for the full wave rectifier tube 127. The winding 125 has its opposite ends connected to the two anodes 128 and 129 of the full wave rectifier 127. The midpoint 130 of the winding 125 is grounded and one side of winding 126 is connected through a choke 131 and by-passed to ground by a filter condenser 133. This furnishes positive plate voltage for operation of the various electron discharge devices. The filter condenser 133 is connected from the midpoint 130 of winding 125 to one side of the filament winding 126 in order to keep alternating current out of the various plate circuits of the electron discharge devices forming the oscillator and amplifier.

As illustrated in Figure 5, the oscillator is of the type commonly referred to as a "sweep oscillator." The oscillating circuit is made up of a gas triode 137 which is provided with a set of charging condensers 138 to 142 and charging resistors 143 and 144. Resistor 144 is provided with a plurality of taps 145 to 149 which are selectively engaged by a movable contact 150. The charging condensers 138 to 142 are arranged in parallel and have one side connected through a resistor 151 to the anode 152 of the gas triode 137. The other side of each of the condensers 138 to 142 is provided with taps 153 to 157 which are arranged to be selectively engaged by a movable contact element 158 which is connected to ground. The contact element 158 is connected to a bank of condensers which gives the required basic frequencies in steps. The control 150, which is a potentiometer, gives gradual frequency control steps. This combination of controls 158 and 158 furnishes a variable means of frequency control covering the entire audio range. The grid 159 of the gas triode 137 is connected through a biasing resistor 160 to ground. The cathode 161 is connected through a self biasing resistor 162 to ground. A by-pass condenser 163 is connected around the biasing resistor 162 in a conventional manner. A plurality of voltage regulator tubes 164, 165 and 166 are connected in series between the movable contact arm 150 and ground, in order to provide stable and accurate voltage regulation of the oscillator circuit. The output of the oscillator is connected through a resistor 167 and coupling condenser 168 to the grid 169 of an amplifier 170. The anode 171 of the amplifier 170 is connected through resistors 172 and 173 to the high potential biasing conductor 132 of the rectifier circuit. The movable contact element 150 of the charging resistor 144 is also connected to the conductor 174 which extends between the resistor 172 and the resistor 173.

The cathode 175 of the amplifier 170 is connected through a biasing resistor 176 to ground. Filter condenser 177 is preferably shunted across the biasing resistor 176. By-pass condenser 178 is also preferably provided between movable contact element 150 and ground, or in other words, is connected in parallel around the three voltage regulators 164, 165 and 166.

Two additional stages of amplification are provided by amplifiers 179 and 180. The anode 171 of the amplifier 170 is connected through a coupling condenser 181 to the grid 182 of the amplifier 179. The cathode 183 of the amplifier 179 is provided with a self biasing resistor 184 and a conventional by-pass condenser 185. The grid is provided with a biasing resistor 186 as shown. The anode 187 receives its bias through resistors 188 and 189 which are connected to the high potential biasing conductor 132. Filter condensers 190 and 191 are preferably provided as shown.

The anode 187 is connected through a coupling condenser 192 to the grid 193 of the amplifier 180. Grid 193 is provided with a biasing resistor 194 connecting the grid to ground. The cathode 195 is provided with a self biasing resistor 196 and a conventional by-pass condenser 197. The anode 198 is connected through resistor 199 to the high potential biasing conductor 132.

The output of the amplifier 180 is connected through a coupling condenser 200 to grids 201 and 202 of electron discharge devices 203 and 204. The two grids 201 and 202 which are connected together are provided with a common biasing resistor 205 which is connected to ground. The filaments 206 and 207 of the tubes 203 and 204 form directly heated cathodes. These filaments 206 and 207 are connected across windings 208 and 209 which are energized from any suitable source of alternating current. A meter in the form of a milli-ammeter 210 is connected between the midpoints 211, 212 of the windings 208 and 209. These midpoints 211 and 212 are also connected through biasing resistors 213 and 214 respectively to ground. Two by-pass condensers 215 and 216 are provided around the biasing resistors 213 and 214.

The detector coil of this embodiment of the invention is given the same reference character 100 as was given the detector coil 100 in the preferred embodiment of the invention as illustrated in Figures 1 to 4 of the drawings, in order to avoid confusion. The detector coil 100 is connected in series with a condenser 217 across a choke coil 218. This condenser 217 stops the flow of direct current through the detector coil 100 and allows the A. C. voltage from the amplifier only to be impressed on the coil 100. The choke 218 may be replaced with a suitable step-down transformer. This permits use of a much smaller detector coil which is connected to the secondary of this transformer. The choke coil 218 is connected at one end to the anode 219 of the tube 203 while it is connected at its other end to a movable contact arm 220 of a variable resistor 221 connected to the anode 222 of the tube 204. The movable contact 220 is also connected to ground through the conductor 223.

In this particular form of the invention the current flowing through the choke 218 and detector circuit to the amplifying tube 203 is balanced against the current flowing through the resistor 221 to the other amplifying tube 204, the condition of balance being indicated by meter 210. When the inductive value of the detector coil 100 is changed by bringing it into proximity of the wall whose thickness is to be measured, the balance on the meter 210 is changed and the variation in the positon of the needle 224 is a function of the thickness of the material against which the detector coil 100 is placed. A meter scale is provided for the meter 210 which is calibrated empirically from known values. The advantage of the operation as shown in Figure 5 lies in the fact that no direct current flows through the detector coil 100. It has been found that under many circumstances more accurate readings of thickness or of other values to be determined may be had when direct current is kept out of the detector coil.

While I have shown and described certain particular embodiments of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. The method of measuring the thickness of a para-magnetic wall enclosing a cavity containing sodium which includes causing the sodium to be disposed directly behind the wall to be measured, then bringing the wall into the concentrated region of a magnetic field produced by a coil carrying alternating current, adjusting the frequency of alternation to a sufficiently great value so that eddy currents produced by the alternating field will not penetrate through the wall into the sodium, and detecting the change in the apparent inductance of the coil.

2. The method of measuring the head wall thickness of a hollow steel valve partially filled with sodium which includes bumping substantially all of the sodium into the head directly behind the head wall, positioning the head wall opposite the end of and in close proximity to a coil carrying alternating current whose frequency of alteration is selected sufficiently high that the depth of eddy current penetration is less than the wall thickness, and detecting the change in the apparent inductance of the coil caused by bringing the head wall into the magnetic field of the coil.

3. The method of measuring the sodium content of a hollow valve partially filled with sodium which includes bumping substantially all of the sodium into the head of the valve directly behind the head wall, positioning the head wall against the end of a coil carrying alternating current, adjusting the frequency of alternation to a value sufficiently low so that the depth of eddy current penetration is greater than the wall thickness, and measuring the change in the apparent impedance of the coil.

4. The method of measuring the sodium content of a hollow valve partially filled with sodium which includes moving substantially all of the sodium into one portion of the valve directly behind one wall of the valve, positioning said wall opposite the end of and in close proximity to a coil carrying alternating current, adjusting the frequency of alternation to the order of magnitude of several hundred cycles per second, and measuring the change in the apparent impedance of the coil.

5. The method of analyzing a ferromagnetic container partially filled with a nonmagnetic, electrically-conducting material, which comprises tilting said container to a position so that a portion thereof fully encloses at least part of said non-magnetic material and positioning an inductance coil energized by alternating current in contacting relationship with said container portion and detecting the apparent impedance change of said coil caused thereby.

6. The method of measuring the thickness of a ferromagnetic container partially filled with a non-magnetic, electrically-conducting material, which comprises positioning said container so that a portion thereof encloses said non-magnetic material, then placing an inductance coil energized by alternating current in close proximity to said container portion and adjusting the frequency of said alternating current so that the depth of eddy current penetration will be less than the thickness of said container and detecting the effect on the apparent impedance of said coil.

7. The method of measuring the thickness of a hollow steel poppet valve partially filled with sodium which comprises positioning said valve so that sodium is contained within the head portion of the valve, applying an inductance coil energized by alternating current to the head portion of said valve, adjusting the frequency of said alternating current to the neighborhood of 5000 cycles per second so that the eddy current penetration will be less than the thickness of the wall of said head portion, and detecting the effect on the apparent impedance of said coil.

8. The method of selectively measuring the thickness of a ferromagnetic container and the amount of non-magnetic, electrically conducting material enclosed thereby which comprises tilting said container to such a position that a portion thereof fully contains said non-magnetic material, applying an inductance coil energized by alternating current in contacting relationship with said container portion and selectively adjusting the frequency of said alternating current to relatively high and low values, to measure the thickness of the wall of said container portion and the non-magnetic material contents thereof, respectively, by detecting the effect on the apparent impedance of said coil, said high value of frequency being sufficient to prevent eddy current penetration through said wall and said low value of frequency being selected to produce eddy current penetration of said wall and contents.

9. The method of selectively measuring the thickness of a ferromagnetic container and the amount of non-magnetic, electrically conducting material enclosed thereby, which comprises tilting said container to such a position that a portion thereof fully contains said non-magnetic material, applying an inductance coil energized by alternating current in contacting relationship with said container portion and selectively adjusting the frequency of said alternating current to the neighborhood of 5000 cycles per second so as to measure the thickness of said wall portion devoid of eddy current penetration through the entire thickness of said wall portion, and at a different time adjusting the frequency to the neighborhood of 180 cycles per second to measure said non-conducting material contents, and measuring the changes in apparent impedance of said inductance coil at both frequencies caused by the presence of said container.

10. The method of discriminating between the impedance effects caused by wall thickness and contents of a ferromagnetic valve enclosing sodium, which comprises completely backing up a wall portion of said wall by sodium and applying an inductance coil energized by alternating current in contacting relationship with said wall portion of said valve, and selectively adjusting the frequency of said alternating current at values of several thousand cycles per second so as to confine eddy current penetration to less than the thickness of said wall for measuring the wall thickness of said wall, and at a different time adjusting the frequency to values of about one hundred cycles per second to insure substantial eddy current penetration through the sodium for analyzing the sodium content, and measuring the apparent impedance change of said coil at both frequencies caused by application of the coil to said wall portion.

REX DE ORE McDILL.

REFERENCES CITED

The following references are of record in the file of this patent:

UNITED STATES PATENTS

| Number | Name | Date |
|---|---|---|
| 1,807,411 | Imes | May 26, 1931 |
| 1,952,185 | Smith | Mar. 27, 1934 |
| 1,964,141 | Rhodes et al. | June 26, 1934 |
| 2,008,141 | Snelling | July 16, 1935 |
| 2,020,067 | Keinath | Nov. 5, 1935 |
| 2,111,210 | Ebel | Mar. 15, 1938 |
| 2,116,119 | Loewenstein | May 3, 1938 |
| 2,226,275 | Abbott et al. | Dec. 24, 1940 |
| 2,337,231 | Cloud | Dec. 21, 1943 |

FOREIGN PATENTS

| Number | Country | Date |
|---|---|---|
| 368,006 | England | Sept. 25, 1940 |

OTHER REFERENCES

Kuehni, General Electric Review, September 1942, pages 533-536.